R. F. DOWNEY.
AUTOMOBILE JACK.
APPLICATION FILED AUG. 19, 1920.

1,394,888.

Patented Oct. 25, 1921.

INVENTOR
Richard F. Downey

BY Frank S. Ratcliffe
ATTORNEY

UNITED STATES PATENT OFFICE.

RICHARD F. DOWNEY, OF MILWAUKEE, WISCONSIN, ASSIGNOR TO AUTOMATIC AUTO JACK COMPANY, OF MILWAUKEE, WISCONSIN, A CORPORATION OF WISCONSIN.

AUTOMOBILE-JACK.

1,394,888.  Specification of Letters Patent.  Patented Oct. 25, 1921.

Application filed August 19, 1920. Serial No. 404,553.

*To all whom it may concern:*

Be it known that I, RICHARD F. DOWNEY, a citizen of the United States, and resident of Milwaukee, in the county of Milwaukee and State of Wisconsin, have invented certain new and useful Improvements in Automobile-Jacks; and I do hereby declare that the following is a full, clear, and exact description thereof.

My invention relates to new and useful improvements in automobile jacks of that type adapted for operation to hold all of the wheels of an automobile or similar vehicle in raised position and which is arranged for actuation by the power of the vehicle as the vehicle is driven over the device.

It is in general the object of my invention to simplify and otherwise improve the structure and to increase the convenience of operation of devices of this character both with respect to the ease with which the vehicle may be mounted on the device, and the readiness with which the vehicle may be released from the device to effect its propulsion therefrom.

It is more particularly an important object of my invention to provide an arrangement automatically operable to effect the entire raising operation of the vehicle driven thereover, and to this end it is specifically my object to provide means for bringing the engaging members for the rear axle into operative position subsequent to passage of the front axle of the vehicle over said members.

It is further my object to provide an improved releasing mechanism for the jack structure which may be operable by tripping a single release member to permit gravity return of the vehicle to a position on the ground.

With the above and other objects and advantages in view, the invention resides more particularly in the novel combination, arrangement and formation of parts more particularly hereinafter described and pointed out in the appended claims.

In the accompanying drawings—

Figure 1:
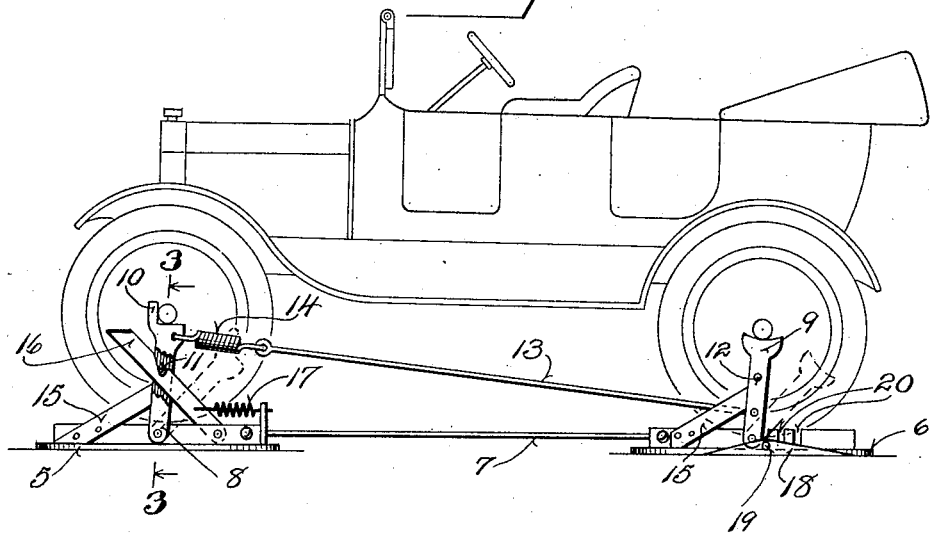
Figure 1 is a side elevational view of an automobile jack embodying my invention, and showing an automobile mounted on the jack in raised position.
Figure 2:
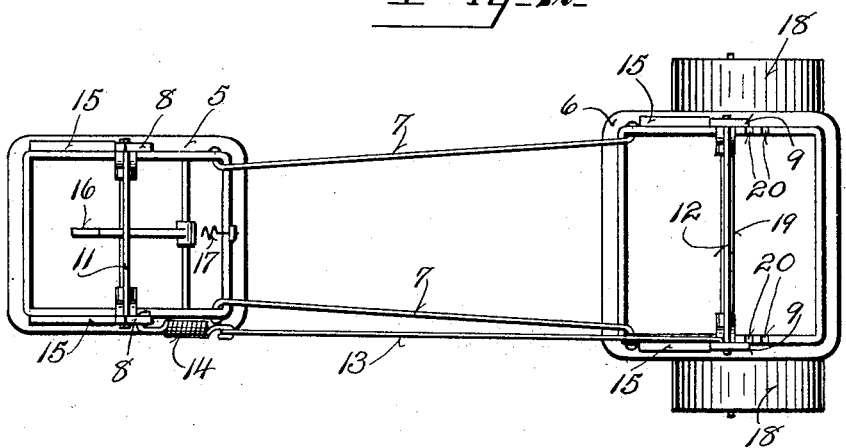
Fig. 2 is a plan view of the jack.
Figure 4:
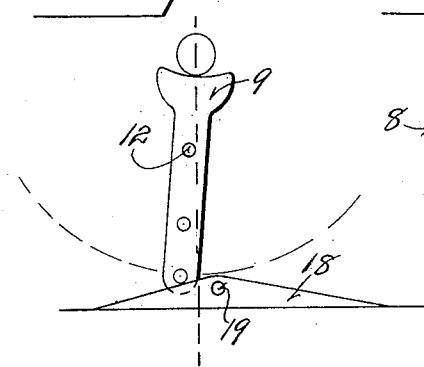
Fig. 4 is a detailed view showing particularly the location of the rear wheels of the vehicle in raised position with respect to the inclined track surfaces.
Figure 3:
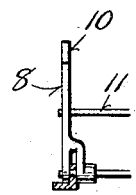
Fig. 3 is a detailed sectional view on the line 3—3 of Fig. 1.

Referring now more particularly to the accompanying drawings, my improved jack comprises a base structure which, in the present instance for purpose of economy of material is formed of front and rear base frames 5 and 6 respectively, connected by a pair of side links 7, each of these links having its end portions laterally directed and passed through the sides of the respective frames whereby to provide pivotal connections for the links so that the frames may tilt under stress as will be later explained, without distorting the links.

A pair of front axle support members 8 are pivoted to and extend upwardly from the sides of the front frame 5, said frame being preferably formed of angle metal having upstanding flange portions for the various pivotal connections of the frame. A pair of rear axle support members 9 are similarly secured to the rear frame 6, the tops of said rear axle support members merely providing arcuate seats for the rear axle of an automobile, while the front axle support members are also provided with concaved axle portions and have upstanding axle engaging fingers 10 at the outer sides of said axle seating portions for engagement by the front axle of the vehicle to hold the supporting member under the axle for the lifting operation. The axle support members of each pair are connected by crossbars 11 and 12 respectively, and the front and rear axle support members are connected by link means pivoted to a pair of said members, the pivotal connection of the link means with the forward axle support member being spaced a greater distance from the frame pivot of said member than is the pivotal connection of the link means with the rear axle support member. In the present arrangement this link means comprises a link bar 13 pivoted to the rear axle support member and connected with a heavy contractile coiled spring 14 pivoted to the front axle support member, although as will be later explained, this spring may be dispensed with in the essential operation of my jack structure. The jacking operation is effected by swinging the jack members upwardly when engaged with the respective vehicle axles and the permitted limit of swinging movement of the jack members is slightly short of vertical or dead center position, the jack members being suitably limited in their movement by stops formed in the present instance by bars 15 secured to and rising obliquely from the base frame for engagement with the axle support members. To hold the axle support members in raised or jacking position, a latch-bar 16 is pivoted to the forward frame 5 and extends under the connecting bar 11 of the front axle support members, being urged there-toward by a spring 17 and being provided in the intermediate portion of its upper face with a latch recess adapted to receive the bar 11 to thus automatically latch the axle-supporting members as they attain their raised position. Movement of the automobile onto the jack is aided by inclined wheel-engaging surfaces of a pair of blocks 18 disposed at the sides of the rear frame, said blocks being connected by a tie-member 19 and being adjustably held with respect to the frame by seating engagement of said tie member selectively in notches 20 formed in the upstanding flange of the rear frame.

Taking up now the operation of my improved jack structure, the axle supporting members are normally in lowered position, as shown in dotted lines, the position of the rear axle support members being sufficiently low to clear any structure under the automobile. The front wheels of the automobile are then driven idly over the blocks 18 and propulsion of the automobile on the ground continued until the front axle engages the fingers 10 of the front axle support 8, whereupon the axle seats on the support member and its raising movement is instituted in a forward direction on the arc of pivotal movement of the front axle support members. During this movement the rear wheels of the automobile engage and ride upwardly on the inclined surfaces of the blocks 18 being hence supplied thereby with sufficient traction to continue the forward movement of the car and at the same time it is noted that the rear wheels are raised from the floor level. During the upward movement of the front axle support members 8, the rear axle support members 9 are being raised by the links 13 from their low position at a relatively greater rate of movement however in view of the differential connections of the link means. As the rear wheels of the automobile reach the peak of the inclined surface of the blocks 18, the rear axle support members 9 engage under the rear axle and the continued slight movement of the automobile by its momentum will suffice to carry the rear portion of the automobile forwardly and slightly upwardly from the peak engagement of its rear wheels with the blocks 18, the front portion of the automobile being carried to its final position, effecting operation of the latch-bar 16 to hold the jack structure in raised position. It is noted that the final portion of the jacking movement after the rear wheels cease their traction action on the inclined surfaces occurs in an arcuate path which involves a minimum lifting action by reason of its relation to the horizontal tangential plane. Hence, the jacking operation may be effectively carried out with a minimum degree of momentum of the automobile so as to avoid the occurrence of shock and strain on the automobile or jack structure. When the momentum however is slightly in excess of the requirements of the apparatus, the front frame 8 would be slightly tilted upwardly, which would not damage the same by reason of its rigid connections and the links 7 would have a slight pivotal movement at their points of connection with the frame.

To release the automobile, it is merely necessary to depress the latch-bar 16, whereupon the gravity load of the automobile will swing the axle support members downwardly and rearwardly to deposit the automobile on the ground, and the spring 14 assists the institution of this movement particularly when the axle support members attain a final position very close to vertical, inasmuch as the spring is tensioned in bringing the rear axle support members 9 to their engaging position, although as heretofore stated in certain designs of the device the spring 14 may be eliminated.

It will also be appreciated that various other changes and modifications of structure may be employed to meet differing conditions of use and manufacture without departing in any manner from the spirit of my invention.

What is claimed is:

1. A vehicle jack of the class described comprising a front frame, a rear frame, said frames being adapted to lie flat on a supporting surface, substantially nonflexible connecting links extending from the rear frame and pivotally connected with a front frame, front axle support members pivoted to and upstanding from the front frame, rear axle support members pivoted to and upstanding from the rear frame and means for holding said members in raised position.

2. A vehicle jack of the class described comprising a front frame, a rear frame, a pair of axle engaging members carried by each frame, a connecting rod for said frames, and means pivotally securing the ends of said rod to said frames whereby the frames may have independent movement under stress without bending said rods and will at the same time be retained in their proper spaced relation.

3. An automobile jack of the class described, comprising a front frame, a rear frame, a pair of axle engaging members carried by each frame, the members of the rear frame being spaced apart a distance greater than the members of the front frame, and a nonflexible connecting link extending from the front frame to the rear frame and pivotally connected therewith to permit independent movement of one frame with respect to the other.

4. A vehicle jack of the class described, comprising a pair of upwardly movable front axle support members, a pair of upwardly movable rear axle support members normally disposed below axle-engaging position, means associated with said rear axle support members for raising said members to axle engaging position subsequent to passage of the front axle thereover, a rod connecting each pair of axle support members whereby unitary movement thereof is assured, a lever having one end pivoted adjacent one pair of axle support members and its other end traversing the rod of said adjacent pair of members, and spring means at all times yieldably urging said lever to engagement with the adjacent said rod, said lever having a locking recess in which the adjacent rod is engageable when the members are moved to operative position to releasably secure said members in said operative position.

5. A vehicle jack of the class described comprising a front frame, a rear frame having a plurality of alined recesses in the sides thereof, a pair of upwardly movable front axle support members carried by the front frame, a pair of upwardly movable rear axle support members carried by the rear frame and normally disposed below axle-engaging position, means associated with said rear axle support members for raising said members to axle-engaging position subsequent to passage of the front axle thereover, a pair of inclined track portions disposed rearwardly of said rear axle support members, and a rod connecting said track portions and adapted for engagement in any of the alined recesses of the rear frame whereby said track portions may be adjusted with respect to said rear axle support members.

In testimony that I claim the foregoing I have hereunto set my hand at Milwaukee, in the county of Milwaukee and State of Wisconsin.

RICHARD F. DOWNEY.